(12) United States Patent
Brickell

(10) Patent No.: US 10,397,005 B2
(45) Date of Patent: Aug. 27, 2019

(54) USING A TRUSTED EXECUTION ENVIRONMENT AS A TRUSTED THIRD PARTY PROVIDING PRIVACY FOR ATTESTATION

(71) Applicant: Intel Corporation, Santa Clara, CA (US)

(72) Inventor: Ernie Brickell, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 271 days.

(21) Appl. No.: 15/475,896

(22) Filed: Mar. 31, 2017

(65) Prior Publication Data

US 2018/0287802 A1    Oct. 4, 2018

(51) Int. Cl.
*H04L 9/14*      (2006.01)
*H04L 9/32*      (2006.01)
(Continued)

(52) U.S. Cl.
CPC .......... *H04L 9/3263* (2013.01); *H04L 9/006* (2013.01); *H04L 9/14* (2013.01); *H04L 9/302* (2013.01);
(Continued)

(58) Field of Classification Search
CPC ......... H04L 9/3263; H04L 9/006; H04L 9/14; H04L 9/3013; H04L 9/302; H04L 9/3066; H04L 9/3247
(Continued)

(56) References Cited

U.S. PATENT DOCUMENTS 7,747,540 B2 *  6/2010  Cameron ............ G06F 21/6263
                                                              705/67
7,844,614 B2    11/2010  Brickell et al.
(Continued)

OTHER PUBLICATIONS

Kravitz, et al., "Secure Open Systems for Protecting Privacy and Digital Services", Electronic Publishing, Artistic Imaging, and Digital Typography, Springer Verlag, DE, vol. 2320, Nov. 12, 2001, pp. 1-20.
(Continued)

*Primary Examiner* — Farid Homayounmehr
*Assistant Examiner* — Thanh T Le
(74) *Attorney, Agent, or Firm* — Trop, Pruner & Hu, P.C.

(57) ABSTRACT

A method, apparatus, and computer-readable medium providing instructions to cause a computing device to establish a portion of a memory of the computing device as a trusted execution environment and execute a trusted third party application within the trusted execution environment. The trusted third party application is to receive a signed public key and an identifier for a verifier from a user client attestation application executing on a client platform. The signed public key is signed with an identifiable platform attestation private key for the client platform. The trusted third party application is further to verify the signed public key, determine a policy of the verifier, encode the policy into a trusted third party anonymous certificate for the signed public key, issue the trusted third party anonymous certificate without including identification information of the client platform, and send the trusted third party anonymous certificate to the user client attestation application.

25 Claims, 5 Drawing Sheets

(51) Int. Cl.
    *H04L 9/00*    (2006.01)
    *H04L 9/30*    (2006.01)
(52) U.S. Cl.
    CPC .......... *H04L 9/3013* (2013.01); *H04L 9/3066* (2013.01); *H04L 9/3247* (2013.01); *H04L 2209/127* (2013.01)
(58) Field of Classification Search
    USPC ....................................................... 713/156
    See application file for complete search history.

(56)              References Cited

U.S. PATENT DOCUMENTS

| 8,782,401 | B2 | 11/2014 | Sarangdhar et al. |
| 8,924,728 | B2 | 12/2014 | Brickell |
| 9,268,968 | B2* | 2/2016 | Chen .................... H04L 9/3073 |
| 2003/0190046 | A1* | 10/2003 | Kamerman ............. H04L 9/006 |
| | | | 380/286 |
| 2004/0243665 | A1* | 12/2004 | Markki .................... H04L 29/06 |
| | | | 709/201 |
| 2006/0020811 | A1* | 1/2006 | Tan ........................ H04L 63/067 |
| | | | 713/180 |
| 2009/0271618 | A1* | 10/2009 | Camenisch ........... G06F 21/445 |
| | | | 713/155 |
| 2012/0297200 | A1 | 11/2012 | Thom et al. |
| 2014/0359289 | A1* | 12/2014 | Camenisch ........... H04L 9/0866 |
| | | | 713/168 |
| 2016/0180061 | A1 | 6/2016 | Pogorelik et al. |
| 2017/0230182 | A1* | 8/2017 | Misoczki ............... H04L 9/3247 |
| 2018/0241560 | A1* | 8/2018 | Chen ..................... G06F 21/577 |
| 2019/0052470 | A1* | 2/2019 | Park ....................... H04L 9/0833 |

OTHER PUBLICATIONS

European Patent Office, Extended European Search Report dated Jun. 13, 2018 in European Patent Application No. 18155642.4.

* cited by examiner

USING A TRUSTED EXECUTION ENVIRONMENT AS A TRUSTED THIRD PARTY PROVIDING PRIVACY FOR ATTESTATION

TECHNICAL FIELD

Embodiments relate to security of electronic communications, and in particular, to enabling a client platform to provide an attestation of authenticity, validity, and/or integrity to a verifier, without exposing privacy-sensitive information of either the client platform or a user of the client platform.

BACKGROUND

Public key cryptography was developed to assure the confidentiality, authenticity and non-repudiation of electronic communications and data storage. Also referred to as asymmetric cryptography, public key cryptography uses pairs of keys: public keys which may be disseminated widely, and private keys which are known only to the owner. The public key cryptography scheme accomplishes two functions: authentication, which is when the public key is used to verify that a holder of the paired private key sent the message, and encryption, whereby only the holder of the paired private key can decrypt the message encrypted with the public key.

In a public key encryption system, any person can encrypt a message using the public key of the receiver, but such a message can be decrypted only with the receiver's private key. For this scheme to work, it must be computationally easy for a user to generate a public and private key pair to be used for encryption and decryption. The strength of a public key cryptography system relies on the degree of difficulty (computational impracticality) for a properly generated private key to be determined from its corresponding public key. Security then depends only on keeping the private key private, and the public key may be published without compromising security.

During electronic communications, a party providing a service (referred to herein as a "verifier") may require authentication of the platform requesting service (referred to herein as a "client platform"). This authentication creates two opposing security concerns. First, the verifier needs to ensure that the provided authentication information originated with a valid client platform running legitimate, verified software and not a malicious adversary emulating the client platform or causing the client platform to execute compromised software. Second, the user of a client platform is concerned with maintaining privacy of sensitive information. In particular, the user of the client platform wants to be able to provide authentication information to different verifiers without those verifiers being able to determine that the authentication information is coming from the same client platform.

DETAILED DESCRIPTION

Figure 1:
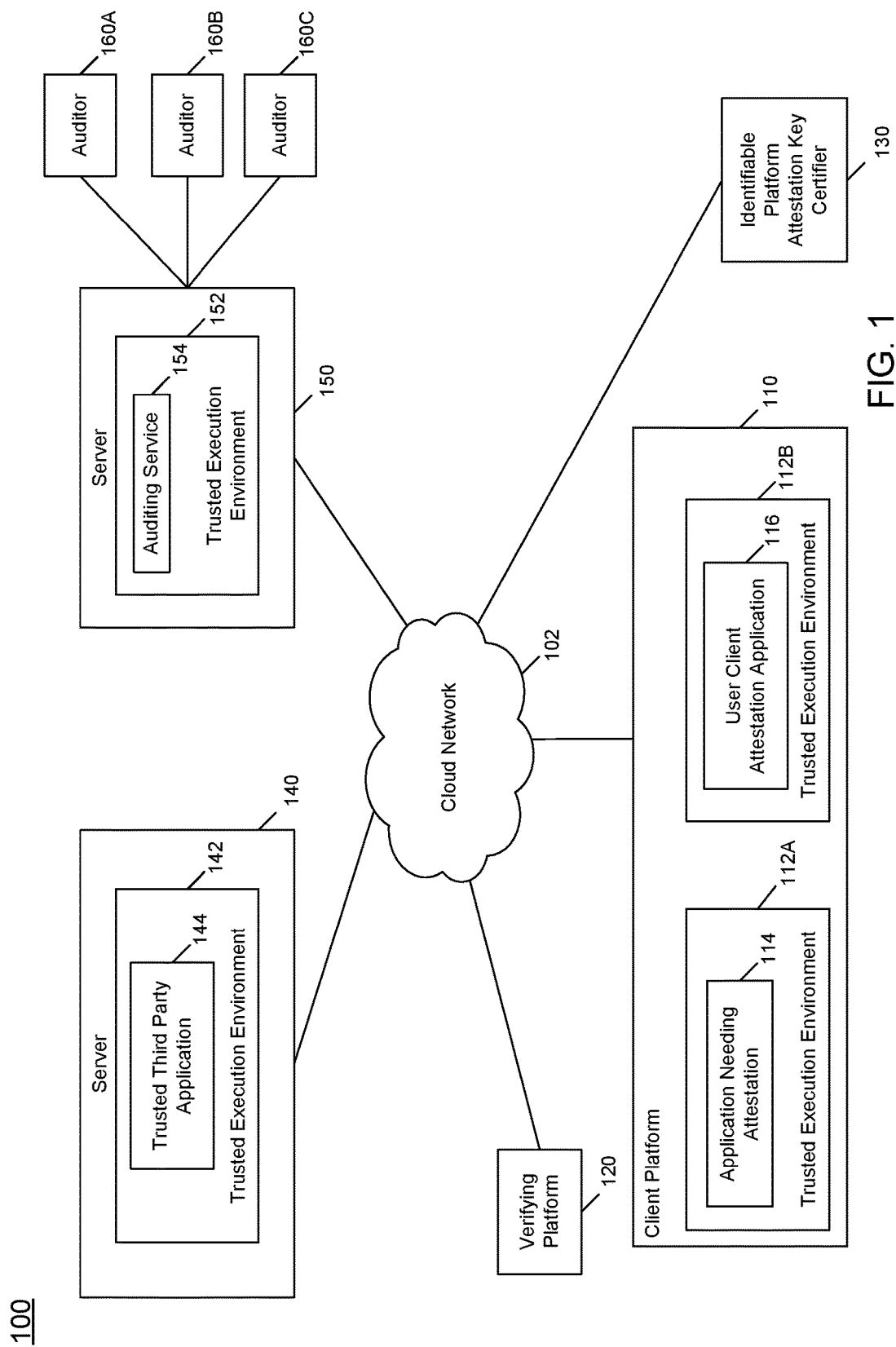
FIG. 1 is a diagram of an environment in which a trusted third party issues an anonymous certificate to a client platform that can be used to attest authenticity and integrity of the client platform, without revealing the client platform's identity or the user's identity.

Trusted Third Parties (TTPs) have been proposed in the past for solving some privacy issues. Specifically, TTPs may be used when a user of a client platform is to provide an attestation certifying authenticity of the client platform to a verifier without revealing the user's identity or the identity of the client platform. The user could send an attestation that includes the user's identity and/or the client platform's identity to a TTP, and then the TTP could issue an anonymous credential to the user. The user could then use the anonymous credential to prove the attestation to the verifier without revealing the user's or the client platform's identity.

Another scenario that can be supported by a TTP is establishing group signatures, where an issuer provides different private keys to a user's devices that can be used to anonymously provide attestation. However, the issuer has the ability to open any signature to reveal the user or device signing the signature. In both of these instances, the user's privacy is dependent upon the trust in the TTP. Privacy advocates have not believed that a TTP could be trusted, given the potential for untrustworthy behavior by TTP operators and administrators.

Given the obstacles to establishing TPPs that can be trusted, alternatives to using TTPs have been developed. For example, one solution to the problem of proving attestation of a client platform without revealing the client platform's or the user's identity was found using cryptography. DAA (Direct Anonymous Attestation, as described in U.S. Pat. No. 7,844,614, inter alia) and EPID (Enhanced Privacy ID, as described in U.S. Pat. No. 8,782,401, inter alia) prove attestation without depending upon a trusted third party.

The public key cryptography underlying DAA (Direct Anonymous Attestation) and EPID (Enhanced Privacy ID) is based upon the assumption that it is computationally infeasible to generate a valid signature for a party without knowing that party's private key. Public key cryptography systems often rely on cryptographic algorithms based on mathematical problems that currently admit no efficient solution-particularly those inherent in certain integer factorization, discrete logarithm, and elliptic curve relationships.

By comparison, a quantum computer of sufficient capability could efficiently solve these mathematical problems using, for example, an algorithm such as Shor's algorithm. This capability would allow a quantum computer to decrypt many of the cryptographic systems in use today, in the sense that there would be a polynomial time algorithm for solving the problem. In particular, the RSA (named for developers of the algorithm Rivest, Sharmir, and Adleman), DSA (Digital Signature Algorithm), Diffie-Hellman, Elliptic Curve Diffie-Hellman, and ECDSA (Elliptic Curve Digital Signature Algorithm) algorithms could be broken. These algorithms are currently used to protect secure Web pages, encrypted email, and many other types of data. Breaking these algorithms would have significant ramifications for electronic privacy and security.

Both DAA (Direct Anonymous Attestation) and EPID (Enhanced Privacy ID) use cryptographic algorithms that could be broken by quantum computers. Cryptography researchers have not yet found a replacement cryptographic solution for DAA and EPID that will be secure once quantum computers have been developed. Thus, to provide privacy with attestation that is secure from being broken by quantum computers, the present disclosure takes advantage of recent developments in trusted execution environments and also provides methods to implement a variety of privacy policies that could be implemented with DAA and EPID, but for which there were not previous methods for implementing using a trusted third party.

The trusted third party disclosed herein operates within a trusted execution environment, thereby mitigating many of the concerns from previous suggestions to use trusted third parties. Without a trusted execution environment, the software implementing the TTP may be modified by an adversary or TTP administrator, and thus the TTP application may be reprogrammed to compromise the user's privacy-sensitive data. By using a trusted execution environment, the software implementing the TTP application cannot be modified without losing access to the user's privacy-sensitive data.

To obtain a certificate from a trusted third party (TTP) executing within a trusted execution environment, the client platform uses an identifiable platform anonymous attestation key pair that has been assigned to the client platform. The identifiable platform attestation key pair includes a public identifiable platform attestation key and a private identifiable platform attestation key. The client platform may create a new public/private anonymous attestation key pair or reuse an existing public/private anonymous attestation key pair. The public anonymous attestation key can be placed in a certificate request signed with the private identifiable platform attestation key, and subsequently sent to the TTP. A certificate signed by another certificate authority that certifies authenticity of the public identifiable platform attestation key may also be sent to the TTP. Once the certificate request is received, the TTP checks that the signed certificate request is valid, and if valid, the TTP issues an anonymous certificate to the client platform for the public anonymous attestation key. The anonymous certificate can be used by the client platform with multiple verifiers without disclosing identifying information for the client platform or a user of the client platform.

Once a certificate is issued by the TTP, the client platform would then use the public identifiable platform attestation key and the TTP-issued anonymous certificate when the client platform receives a request for an attestation from a verifier. Since neither the public identifiable platform attestation key nor the TTP anonymous certificate contains identifying information for the client platform, the verifier receives no information about the identity of the client platform.

Policies for trusted third parties are described herein that provide a balance between the needs of verifying parties to be able to detect and revoke keys that have been compromised and the privacy needs of a user to be informed if the trusted third party reports any suspected misuse of the user's client platform keys. The concept of auditors for the TTP is introduced, and an explanation is given of how auditors can further protect the privacy needs of users.

Policies implemented in the TTP application meet the privacy needs of users, minimize the effect of attestation keys that have been compromised, and identify attestation keys that should be revoked in the case of evidence that an anonymous key has been compromised. An auditing service that helps in meeting these requirements is also described.

In the following description, certain terminology is used to describe certain features of one or more embodiments of the invention. For instance, "platform" is defined as any type of communication device that is adapted to transmit and receive information. Examples of various platforms include, but are not limited or restricted to computers, personal digital assistants, cellular telephones, set-top boxes, facsimile machines, printers, modems, routers, or the like. A "communication link" is broadly defined as one or more information-carrying mediums adapted to a platform. Examples of various types of communication links include, but are not limited or restricted to electrical wire(s), optical fiber(s), cable(s), bus trace(s), or wireless signaling technology.

A "verifier" refers to any entity (e.g., person, platform, system, software, and/or device) that requests some verification of authenticity or authority from another entity. Normally, the request for authenticity or authority is performed prior to disclosing or providing some information requested by the other entity. A "prover" refers to any entity that has been requested to provide some proof of its authority, validity, and/or identity. A "device manufacturer," which may be used interchangeably with "certifying manufacturer," refers to any entity that manufactures or configures a platform or device.

As used herein, the user of the term to "prove" or "convince" a verifier that a prover has possession or knowledge of some cryptographic information (e.g., signature key, a private key, etc.) means that, based on the information and proof disclosed to the verifier, there is a high probability that the prover has the cryptographic information. To prove this to a verifier without "revealing" or "disclosing" the cryptographic information to the verifier means that, based on the information disclosed to the verifier, it would be computationally infeasible for the verifier to determine the cryptographic information.

A "trusted computing base" of a computer system is the "totality of protection mechanisms within the computer system, including hardware, firmware, and software, the combination of which is responsible for enforcing a computer security policy . . . . The careful design and implementation of a system's trusted computing base is paramount to its overall security . . . . Modern operating systems strive to reduce the size of the TCB so that an exhaustive examination of its code base (by means of manual or computer-assisted software audit or program verification) becomes feasible." (Source: https://en.wikipedia.org/wiki/Trusted_computing_base, visited Aug. 25, 2016.)

Security of the TCB can be implemented via a "chain of trust." A chain of trust is established by validating each layer of hardware and software, beginning with the hardware and iteratively validating each firmware and software component that is loaded into memory. A chain of trust is typically established during a boot of the computer system. The chain of trust begins with a trust anchor, such as the hardware of the computing system, which is trusted because the hardware will only boot from firmware or software that is digitally signed. A trust anchor may also be referred to as a "root of trust."

The signing authority for firmware and/or software will only sign boot programs that enforce security, such as only running programs that are themselves signed, or only allowing signed code to have access to certain features of the computing system. The establishment of a chain of trust may continue through several software layers. Each component of a computer system assumes trust of its predecessor component (i−1) and measures the integrity of its successor component (i+1) before relinquishing control to the successor component. This process repeats iteratively until all components of the computer system's code base are trusted.

Many computer systems include a hardware Trusted Platform Module, which is a secure cryptoprocessor/dedicated microcontroller designed to secure hardware by integrating cryptographic keys into devices. In operating systems, the TCB typically consists of the kernel (or microkernel) and a select set of system utilities (for example, setuid programs and daemons in UNIX systems). In programming languages that have built-in security features, such as Java and E, the TCB may be formed of the language runtime and standard library.

A "trusted execution environment (TEE)" is an environment in a computer system that is isolated from the main operating system, using both hardware and software to provide the isolation. A trusted execution environment typically has a much smaller trusted computing base than the main operating system, and therefore is considered more secure than the main operating system and offers a level of increased security for executing applications. Trusted applications running in a TEE have access to the full power of a device's main processor and memory, while hardware isolation protects the trusted applications from user-installed applications running in a main operating system. Software and cryptographic isolation inside the TEE protect the trusted applications contained within the TEE from each other. A trusted execution environment may be implemented by a processor that includes secure execution technologies such as Intel® SGX technology, Intel® Manageability Engine, or an ARM TrustZone.

For a trusted execution environment, the root of trust/trust anchor evaluates the computing platform, including measuring platform components in the boot and launch environment that are in the trusted computing base of the TEE. This root of trust also provides a trusted position to record a measurement of the platform components. Once a basic root of trust and a secure basis for measurement and evaluation is established, other mechanisms can be used to seal and protect secrets in memory, as well as provide local or remote attestation of system configuration.

The term "linking" of certificates is used herein to describe associating two or more certificates as being issued to the same platform. Linking a TTP anonymous certificate issued to a client platform to another certificate containing identifying information for the client platform and/or the user of the client platform enables the identifying information to be determined for the TTP anonymous certificate. Linking is performed by a TTP, as the TTP possesses the secret identifying information for the client platform and/or user of the client platform that was used to issue the TTP anonymous certificate. In one embodiment, certificates may be linked by the TTP in response to a request from a verifying party or in response to receiving evidence that a private attestation key has been compromised. In another embodiment, certificates may be linked by the TTP upon generation of a TTP anonymous certificate, but the linking may be revealed to other parties only in restricted circumstances, such as upon receiving evidence that a private attestation key has been compromised.

Certificates may be linked by a TTP in accordance with a policy required by a verifier. For example, a verifier policy might require all certificates issued by a trusted third party for a given client platform to a particular verifier to be linked, but disallow linking certificates for the given client platform to different verifiers. As another example, another verifier policy might require a TTP anonymous certificate to be linked to an identifiable platform attestation certificate for a client platform. A verifier policy may also specify circumstances in which linking may be revealed to other parties.

FIG. 1 is a diagram of an environment 100 in which a trusted third party issues anonymous credentials to a client platform that can be used to attest authenticity, validity, or integrity of the client platform, without revealing the client platform's or the user's identity. The components of environment 100 communicate via cloud network 102. Environment 100 includes client platform 110, which includes two trusted execution environments 112A and 112B, which are isolated from each other.

In some embodiments, a trusted execution environment such as TEE 112A or 112B may be implemented by a processor that includes secure execution technologies such as Intel® SGX technology, Intel® Manageability Engine, or an ARM TrustZone. For a trusted execution environment, a root of trust evaluates the computing platform, including measuring platform components in the boot and launch environment that are in the trusted computing base of the TEE. This root of trust also provides a trusted position to record a measurement of the platform components. Once a basic root of trust and a secure basis for measurement and evaluation is established, other mechanisms can be used to seal and protect secrets in memory, as well as provide local or remote attestation of system configuration.

In one embodiment, a trusted execution environment is implemented using Intel® Software Guard Extensions (SGX) technology. Intel® SGX technology includes a set of processor instruction extensions that allow a processor to establish one or more secure enclaves in memory. Secure enclaves may be embodied as regions of memory including software, where the regions of memory are isolated from other software executed by the processor. Each secure enclave may include code and data that is measured, validated, or otherwise authenticated. The contents of each secure enclave may be protected from access and/or tampering using any combination of hardware protection and/or cryptographic protection.

Referring again to FIG. 1, within trusted execution environment 112A, an application needing attestation 114 may run. Within trusted execution environment 112B, a user client attestation application 116 may run. As noted above, trusted execution environments 112A and 112B are isolated from each other.

Verifying platform 120 may request client platform 110 to provide authentication information when client platform 110 requests services from verifying platform 120. In response, client platform 110 may provide an attestation of authenticity signed using an identifiable platform attestation private key for client platform 110. In a public key signature system, an entity can combine a message with a private key to create a short digital signature on the message. Anyone with the corresponding public key can combine a message (in this case, the attestation of authenticity), a putative digital signature on the message, and a known public key to verify whether the signature is valid. Changing the message, even replacing a single letter, will cause verification to fail: in a secure signature system, it is computationally infeasible for anyone who does not know the private key to deduce it from the public key or from any number of signatures, or to find a valid signature on any message for which a signature has not hitherto been seen. Thus, the authenticity of a message can be demonstrated by the signature, provided the owner of the private key keeps the private key secret.

The identifiable platform attestation key pair for client platform 110 is certified by identifiable platform attestation key certifier 130. Identifiable platform attestation key certifier 130 may initially issue identifiable platform attestation key pairs to various platforms and is capable of certifying identifiable platform attestation key pairs. Identifiable platform attestation keys may be digital signature/verification key pairs or signature keys for a group-based signature scheme.

To preserve privacy, a user of a client application such as application needing attestation 114 executing on client platform 110 would like to provide attestation to the verifying party 120 without identifying the client platform 110 or the user of client platform 110. The user of client application 110 may also prefer to provide an attestation for the client platform 110 without linking the attestation to other attestations that have been made for the client platform 110.

Application needing attestation 114 requests a user client attestation application 116, which runs in a different trusted execution environment 112B on the client platform 110, to provide an attestation for client platform 110 to verifying platform 220. User client attestation application 116 sends a request for an anonymous certificate to trusted third party application 144, providing a public anonymous attestation key for client platform 110 in the certificate request, which is signed with the private identifiable platform attestation key for client platform 110.

To provide an anonymous certificate to client platform 110, a trusted third party application 144 executes in a trusted execution environment 142 on a server 140. TTP application 144 provides a signed TTP anonymous certificate in response to a certificate request from client platform 110. The certificate request includes an identifier for a verifier to which the TTP anonymous certificate is to be provided. TTP application 144 dynamically determines a policy specified by the verifier regarding use of the TTP anonymous certificate and encodes the verifier policy into the TTP anonymous certificate. In one embodiment, the verifier policy specifies whether the TTP anonymous certificate is required to be linked to other certificates issued to client platform 110.

In one embodiment, code for TTP application 144 is written to enforce rules specified by the verifier policy encoded in the TTP anonymous certificates. For example, the verifier policy may require TTP application 144 to link certificates meeting specified criteria, such as certificates issued to the same client platform for the same verifier. Code for TTP application 144 may be written to dynamically determine the verifier policy encoded in a TTP anonymous certificate and to link only the certificates required to be linked by the verifier policy. By including code that follows rules specified by the verifier policy, TTP application 144 ensures that the verifier policy rules cannot be violated or changed without changing the code for the TTP application 144. If the code for TTP application 144 is changed, the upgraded code for the TTP application would not be able to access the secrets of the previous version of the TTP application, such as the identity of the client platform and the mapping of the identity of the client platform to the anonymous certificate. Consequently, the upgraded code for the TTP application would not have access to links provided by the previous version of the TTP application.

Referring again to FIG. 1, an auditing service 154 executes within a trusted execution environment 152 of server 150. Auditing service 154 ensures that any linking of certificates by a TTP is recorded in a published report or otherwise reported to user(s) of the client platform(s) affected by the linked certificates. Auditing service 154 ensures that a TTP cannot secretly link certificates without informing the affected users of client platforms. Auditing service 154 requests auditors 160A, 160B, and 160C to ensure that linking of certificates is reported either in a published report or directly to user(s) of the client platform(s) affected by the linked certificates.

In one embodiment, code for TTP application 144 is written to follow rules specified as an audit policy by an auditing service 154 for TTP applications. For example, auditing service 154 may require TTP applications to report any linking of a TTP anonymous certificate to another certificate. Depending upon the rules specified by auditing service 154, the linking may be required to be reported in a published report or may be reported directly to user(s) of the client platform(s) affected by the linking of certificates. Auditing service 154 ensures that a TTP cannot secretly link certificates, thereby enabling identifying information for the client platform and/or user(s) of the client platform to be determined for a TTP anonymous certificate, without reporting the linkage of the certificates. By including code that follows rules specified by auditing service 154, TTP application 144 ensures that the auditing rules cannot be violated or changed without changing the code for the TTP application 144.

In one embodiment, the TTP application 144 that executes in a trusted execution environment 142 is written so that all of the executable code is included in the TTP application 144 at launch time. Including all of the executable code for the TTP application 144 at launch time ensures that all code to be executed by the TTP application 144 is included in the attestation of the TTP application 144. An attestation of the TTP application 144 may be provided to the user client attestation application 116 to initially establish trust between the user client attestation application 116 and the TTP application 144.

In one embodiment, the attestation of the TTP application 144 uses the unique identifiable platform attestation key for the platform on which the TTP application 144 executes. The identifiable platform attestation key identifying the TTP platform can be used rather than an anonymous credential, as there is no need to provide privacy for the TTP application 144. Code for the TTP application 144 is intended to be published broadly so that anyone can check the attestation of the TTP application 144 to assure that the TTP application 144 includes the same code as the published code. Furthermore, publishing code for the TTP application 144 ensures that anyone can verify the functionality of the TTP application 144.

In addition, the TTP application 144 may call an EGETKEY instruction to obtain keys usable by the trusted execution environment 142 for symmetric encryption and authentication. The EGETKEY instruction will obtain keys that are tied to the hash of the code for the TTP application 144, not to the signer of the code. By tying the keys to the hash of the code for the TTP application 144, an update to the TTP application 144 cannot access the secrets that were sealed to a previous version of the TTP application 144, such sealed secrets including the identity of the client platform and the mapping of the identity of the client platform to the anonymous certificate.

For purposes of scalability, multiple TTP application 144 instances may share common keys. For example, multiple TTP 144 application instances may share the same anonymous attestation private key used for signing anonymous attestation certificates. Providing multiple TTP application instances that can sign anonymous attestation certificates avoids bottleneck that may occur if a single TTP application instance were to service all requests for anonymous attestation certificates.

Figure 2A:
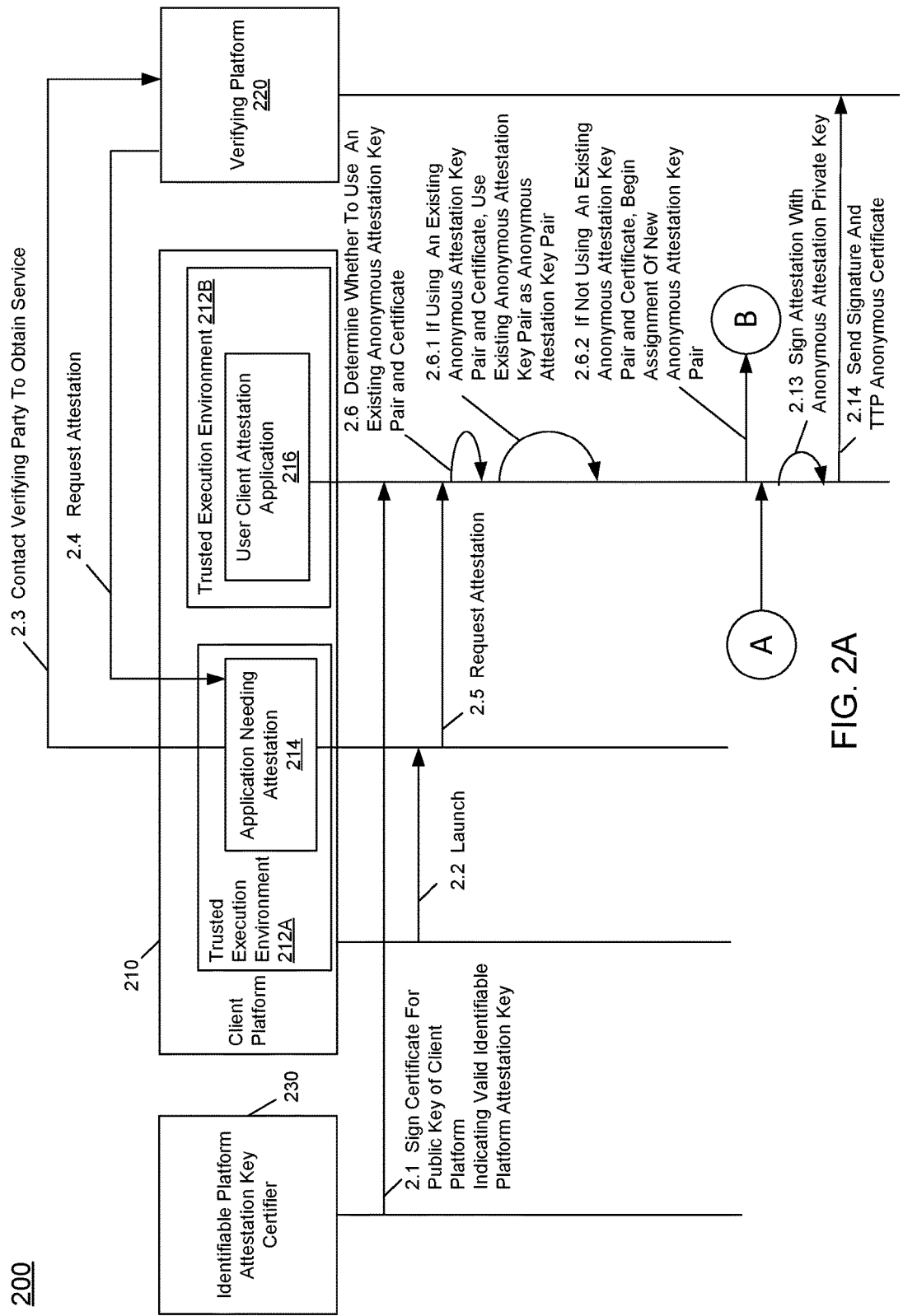
FIG. 2A is a flow diagram showing actions taken by a platform attestation key certifier, a client platform, and a verifying platform to provide an attestation of the client platform to the verifying platform.
Figure 2B:
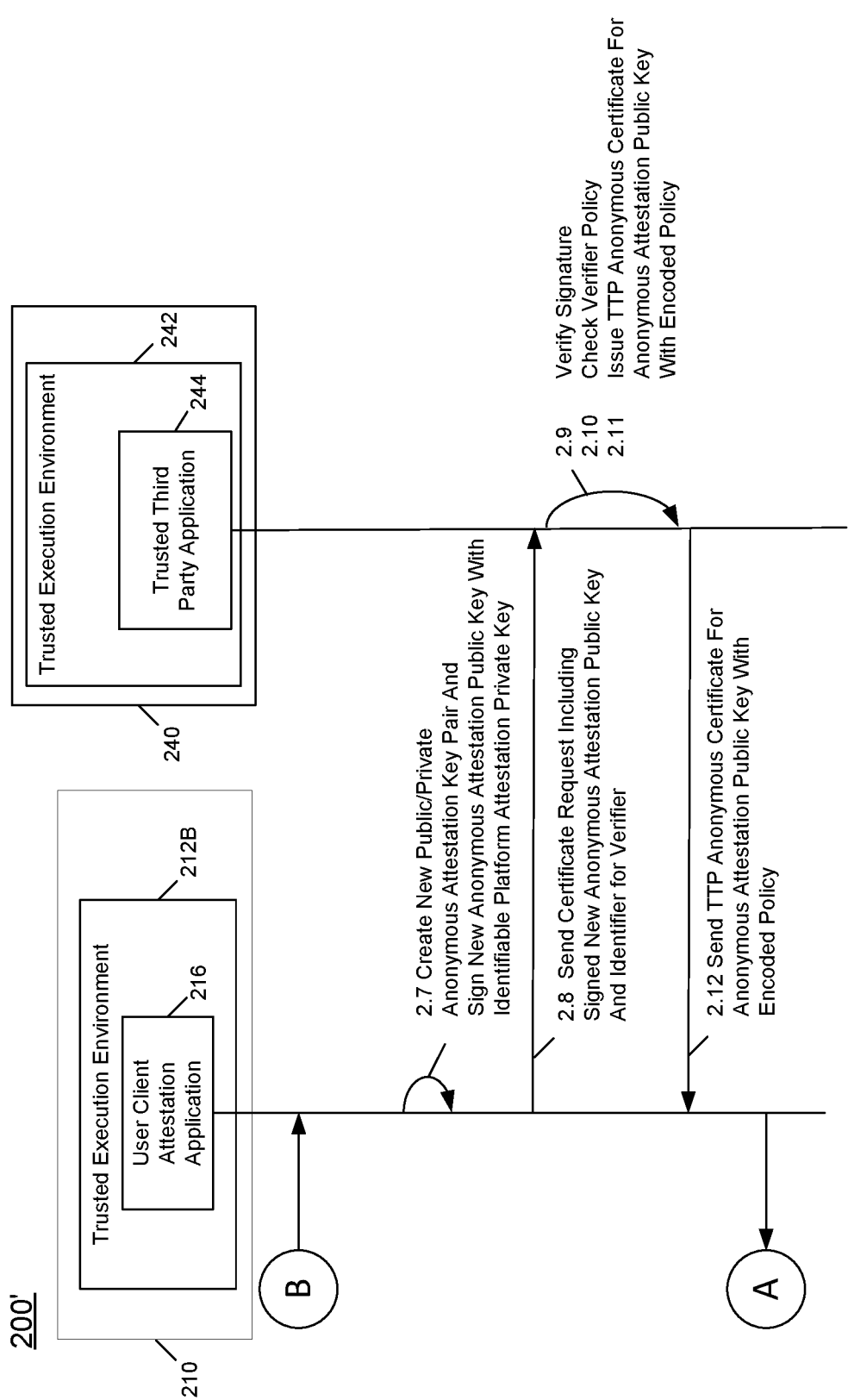
FIG. 2B is a flow diagram showing additional actions taken by the client platform and a trusted third party application that provides an anonymous certificate to the client platform for use in providing an attestation of the client platform to the verifying platform.

FIG. 2A is a flow diagram showing actions taken by an identifiable platform attestation key certifier, a client platform, and a verifying platform. The basic flow for using an identifiable platform attestation key to provide an attestation while preserving privacy of the client platform using a trusted third party is shown in FIGS. 2A and 2B.

Environment 200 includes similar components to those shown in FIG. 1, including client platform 210, verifying platform 220, and identifiable platform attestation key certifier 230. In action 2.1 of FIG. 2A, identifiable platform attestation key certifier 230 signs a certificate for the client platform 210, indicating that the client platform's identifiable platform attestation public key is a valid identifiable platform attestation key. With a certificate indicating that the client platform's identifiable platform attestation public key is a valid identifiable platform attestation key, the client platform can use the certificate to verify authenticity of its signature along with an attestation to a party requesting attestation from the client platform. The certificate for the identifiable platform attestation public key is provided to user client attestation application 216 running within trusted execution environment 212B of client platform 210.

In action 2.2, a user (not shown) of client platform 210 launches an application referred to as an application needing attestation 214. The application needing attestation 214 is launched within trusted execution environment 212A of client platform 210. In action 2.3, the application needing attestation 214 contacts verifying platform 220 to obtain a service. In response to the request for service from client platform 210, verifying platform 220 requests an attestation from client platform 210.

In response to receiving the request for attestation from verifying platform 220, in action 2.5, the application needing attestation 214 requests user client attestation application 216 to provide an attestation to verifying platform 220. In action 2.6, user client attestation application 216 makes a decision whether to use an existing anonymous attestation key pair and certificate for the attestation to verifying platform 220. If the same anonymous attestation key is used for both the new attestation and previous attestations, verifying platform 220 can determine that the same client platform 210 performed both attestations. Consequently, any privacy information that is learned from one attestation could be tied to the other attestation; thus, privacy information of client platform 210 is revealed to the verifying platform 220 concerning the client platform 210 or the user of client platform 210.

In some situations, revealing the user's or client platform's privacy information to the verifying party may be acceptable to the user. For example, if the verifying platform 220 is a bank, and the user has already revealed his identity and the identity of his client platform to the bank to establish an account, the user may find it acceptable to link previous attestations to a new attestation to the bank for another purpose, such as for opening a new account. In action 2.6.1, if user client attestation application 216 has decided to use an existing anonymous attestation key pair and certificate, the already-existing anonymous attestation key pair is used as the anonymous attestation key pair for the new attestation.

In action 2.6.2, if user client attestation application 216 has decided not use an existing anonymous attestation key pair and certificate, user client attestation application 216 begins assignment of a new anonymous attestation key pair. Control transitions to entry point B of FIG. 2B.

FIG. 2B is another flow diagram showing additional actions taken by the client platform of FIG. 2A and a server platform 240 including a trusted execution environment 242 in which a trusted third party application 244 executes. From entry point B of FIG. 2B, at action 2.7, user client attestation application 216 running in trusted execution environment 212B of client platform 210 creates a new public/private anonymous attestation key pair. User client attestation application 216 signs the new anonymous attestation public key with the identifiable platform attestation private key. In action 2.8, user client attestation application 216 sends a certificate request to the trusted third party application 244 running in trusted execution environment 242 of server 240. The certificate request includes the signed new anonymous attestation public key and an identifier for the verifier (such as the name of the verifier) requesting the attestation of client platform 210. The certificate request is signed by the identifiable platform attestation private key.

In action 2.9, trusted third party application 244 verifies the signature on the certificate request from user client attestation application 216. In action 2.10, trusted third party application 244 checks the policy of the verifier identified in the certificate request. For example, trusted third party application 244 may check the policy for the verifying platform 220 to determine whether linking the TTP anonymous certificate to other certificates is required. For example, a verifier policy might require all certificates issued by a trusted third party for a given client platform to a particular verifier to be linked, but disallow linking certificates for the given client platform to different verifiers. As another example, another verifier policy might require a TTP anonymous certificate to be linked to an identifiable platform attestation certificate for a client platform.

In action 2.11, trusted third party application 244 issues the TTP anonymous certificate for the new anonymous attestation public key now being used for providing an attestation to verifying platform 220. The TTP anonymous certificate includes an encoded policy for verifying platform 220. In action 2.12, trusted third party application 244 provides the TTP anonymous certificate for the new anonymous attestation public key with the encoded policy to user client attestation application 216. Control then returns to entry point A of FIG. 2A.

At entry point A of FIG. 2A, control may have transitioned from action 2.6.1 of FIG. 2A, where reuse of the anonymous attestation key pair is allowed and an existing anonymous attestation key pair is being used as the anonymous attestation key pair. Alternatively, control may have transitioned from action 2.12 of FIG. 2B, where reuse of the anonymous attestation key pair is not allowed. At the transition from action 2.12 of FIG. 2.12 of FIG. 2B to entry point A of FIG. 2A, a new anonymous attestation key pair has been generated and an anonymous TTP anonymous certificate has been provided by trusted third party application 244.

From entry point A of FIG. 2A, in action 2.13, user client attestation application 216 signs an attestation to be sent to verifying platform 220 with the anonymous attestation private key determined in either action 2.6.1 of FIG. 2A or 2.7 of FIG. 2B. In action 2.14, user client attestation application 216 sends the signature and the TTP anonymous certificate obtained from trusted third party application 244 to verifying platform 220. If user client attestation application 216 is using a previously existing anonymous attestation key, the corresponding previous TTP anonymous certificate is sent.

Figure 3:
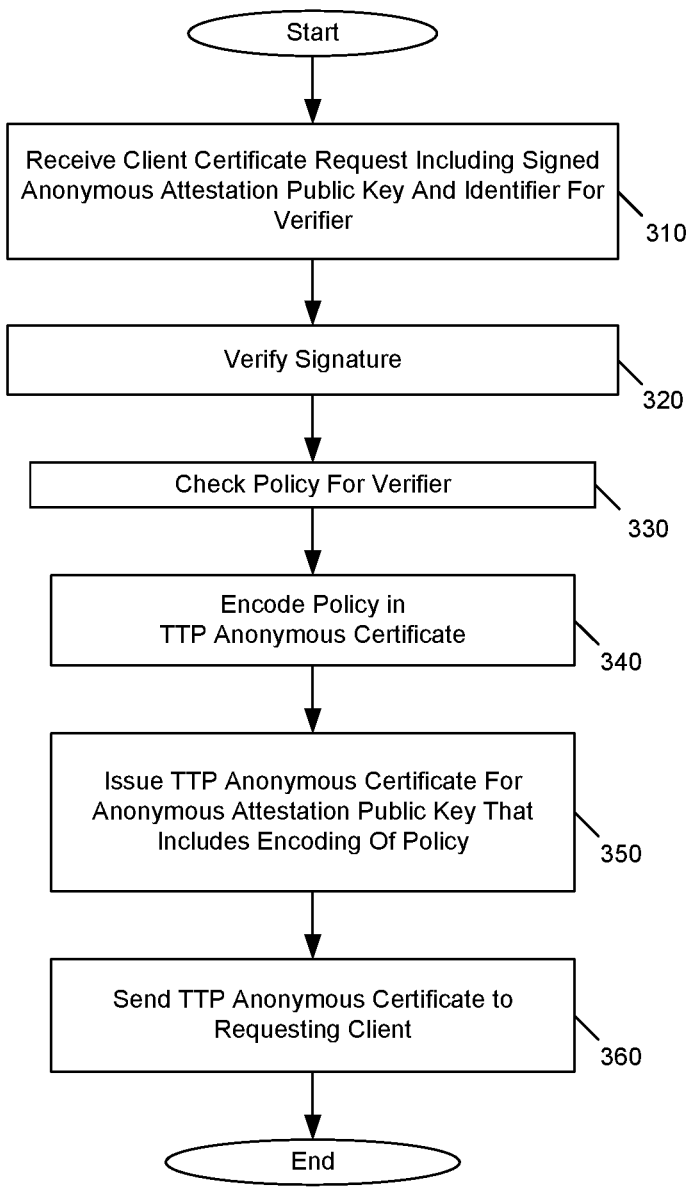
FIG. 3 is a flowchart of actions taken by a trusted third party to issue a trusted third party anonymous certificate to a client platform.

FIG. 3 is a flowchart of actions taken by a trusted third party to issue a trusted third party anonymous certificate to a client platform. The actions performed with respect to FIG. 3 are described as being performed by the components of environments 200 and 200' of FIGS. 2A and 2B; in particular, the flowchart describes actions taken by trusted third party application 244.

At "Receive Client Certificate Request Including Signed Anonymous Attestation Public Key and Identifier for Verifier" block 310, trusted third party application 244 receives a certificate request from client platform 210. The certificate request includes a signed anonymous attestation public key for client platform 210 as well as an identifier for the verifying platform 220 requesting an attestation for client platform 210. Control proceeds to "Verify Signature" block 320, where trusted third party application 244 verifies the signed anonymous attestation public key for client platform 210 that was provided as part of the certificate request. The authenticity of a signature generated from a fixed message and a fixed private key can be verified using the corresponding public key for client platform 210 and a signature verification algorithm.

From "Verify Signature" block 320, control proceeds to "Check Policy for Verifier" block 330. Trusted third party application 244 checks the policy for the verifying platform 220 to determine whether linking the TTP anonymous certificate to other certificates is required. For example, a verifier policy might require all certificates issued by a trusted third party for a given client platform to a particular verifier to be linked, but disallow linking certificates for the given client platform to different verifiers. As another example, another verifier policy might require a TTP anonymous certificate to be linked to an identifiable platform attestation certificate for a client platform. Other types of policies are discussed in further detail below.

From "Check Policy for Verifier" block 330, control proceeds to "Encode Policy in TTP Anonymous Certificate" block 340. Trusted third party application 244 inserts a code representing the type of policy required by the verifier into the TTP anonymous certificate. For example, a code "A" might represent a policy that requires all certificates issued by a trusted third party for a given client platform to a particular verifier to be linked, but disallows linking certificates for the given client platform to different verifiers. A code "B" might represent a policy that requires a TTP anonymous certificate to be linked to an identifiable platform attestation certificate for a client platform.

From "Encode Policy In TTP Anonymous Certificate" block 340, control proceeds to "Issue Anonymous TTP Anonymous Certificate For Anonymous Attestation Public Key That Includes Encoding of Policy" block 350, wherein trusted third party application 244 issues the TTP anonymous certificate for the client platform 210. The TTP anonymous certificate is an anonymous credential, attesting to the authenticity of client platform 210 without including identifying information for client platform 210 or a user of client platform 210.

Control then proceeds to "Send TTP Anonymous Certificate to Requesting Client" block 360, wherein trusted third party application 244 sends the TTP anonymous certificate to the requesting client; in the example described herein, the TTP anonymous certificate is sent to the user client attestation application 216 running within trusted execution environment 212B of client platform 210.

As described above, the term "linking" of certificates is used herein to describe associating certificates related to a client platform. Certificates may be linked by the TTP in response to a request from a verifying party or in response to receiving evidence that a private attestation key has been compromised. Alternatively, certificates may be linked by the TTP upon generation of a TTP anonymous certificate, but the linking may be revealed to other parties only in restricted circumstances, such as upon receiving evidence that a private attestation key has been compromised.

Figure 4:
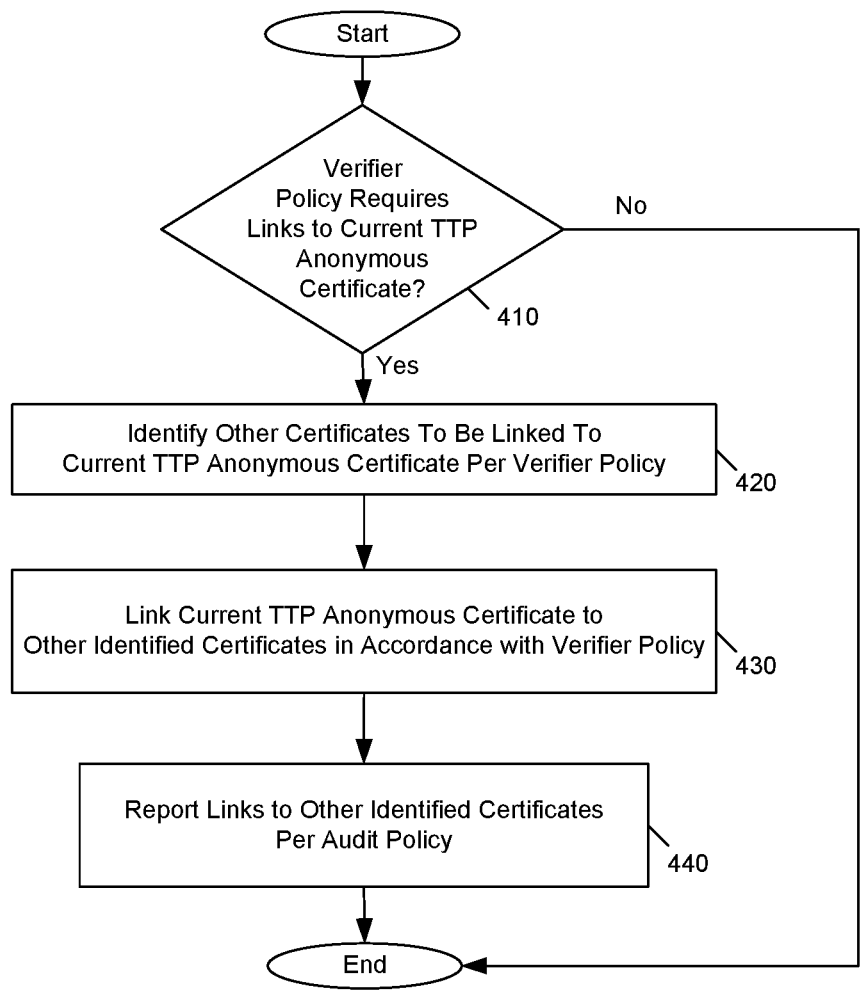
FIG. 4 is a flowchart of actions taken by the trusted third party to link trusted third party anonymous certificates issued to the client platform by the trusted third party to other certificates for the client platform in accordance with a verifier policy.

FIG. 4 is a flowchart of actions taken by the trusted third party to link third party certificates to one another in accordance with a verifier policy. At "Verifier Policy Requires Links to Current TTP Anonymous Certificate?" decision point 410, a determination is made whether the verifier policy requires the current TTP anonymous certificate to be linked to other certificates. If not, the process ends, with no links to the current TTP anonymous certificate being made. If the verifier policy requires links to the current TTP anonymous certificate, control proceeds to "Identify Other Certificates To Be Linked To Current TTP Anonymous Certificate Per Verifier Policy" block 420. At "Identify Other Certificates To Be Linked To Current TTP Anonymous Certificate Per Verifier Policy" block 420, a determination is made of other certificates that meet the verifier policy for linking. For example, a verifier policy might require all certificates issued by a trusted third party for a given client platform to a particular verifier to be linked, but disallow linking certificates for the given client platform to different verifiers. As another example, another verifier policy might require a TTP anonymous certificate to be linked to an identifiable platform attestation certificate for a client platform. A verifier policy may also specify circumstances in which linking may be revealed to other parties.

From "Identify Other Certificates To Be Linked To Current TTP Anonymous Certificate Per Verifier Policy" block 420, control proceeds to "Link Current TTP Anonymous Certificate To Other Identified Certificates In Accordance With Verifier Policy" block 430. The current TTP anonymous certificate is linked to each of the other certificates identified in "Identify Other Certificates To Be Linked To Current TTP Anonymous Certificate Per Verifier Policy" block 420. Control then proceeds to "Report Links to Other Identified Certificates Per Audit Policy" block 440. As noted above, an auditing service, such as auditing service 154 of FIG. 1, may establish an audit policy requiring links between certificates to be published and/or reported to user(s) of affected client platform(s). At "Report Links to Other Identified Certificates Per Audit Policy" block 440, links between the current TTP anonymous certificate and the other linked certificates are reported in accordance with the audit policy.

In another embodiment (not shown in FIG. 4), user permission to link certificates may be obtained before the certificates are linked and, if user permission is not granted, the certificates are not linked. Other combinations of approvals of linkages and user permission may also be implemented.

In addition to policies issued by verifiers for linking of certificates, a trusted third party also may establish policies regarding linking of the TTP anonymous certificates that the trusted third party issues. In each case, the policy provided may be included in a field in the TTP anonymous certificate sent back to the client platform. For example, a trusted third party may operate using a policy to provide different TTP anonymous certificates for use with different verifiers. Under this policy, all of the TTP anonymous certificates issued to the same identifiable platform attestation certificate owner for use with a particular verifier could be linked. However, TTP anonymous certificates issued for use with other verifiers could not be linked to the TTP anonymous certificates for that particular verifier.

One method for implementing such a policy is for the TTP to produce an identifier for the TTP anonymous certificate using a pseudo-random function with the following inputs: (1) an identifier for the verifier, such as the name of the verifier, (2) the identifiable platform attestation certificate of the user, and (3) a secret value known only to the TTP application. The TTP application could save this identifier in the TTP anonymous certificate. The identifier would always be the same for that verifier and that identifiable platform attestation certificate. The TTP application would not release the secret value. This TTP-issued certificate would contain the public key of the user, an identifier for the verifier, and the identifier produced by the pseudo-random function.

In one embodiment, the user client attestation application may also ensure that the TTP-issued certificate is used only for one particular verifier. One implementation includes a public encryption key for the verifier in addition to an identifier for the verifier in the certificate. The user client attestation application may use the verifier's public key to encrypt the attestation, using a randomized encryption operation. The encrypted attestation would appear to be random to anyone except the owner of the corresponding verifier private key.

Another policy that may be used is for a verifier to be able to link a TTP anonymous certificate issued back to the identifiable platform attestation certificate. If one verifier had convincing evidence that the identifiable platform attestation key used in a particular TTP anonymous certificate had been compromised, then the TTP could provide the link for that TTP anonymous certificate to the corresponding identifiable platform attestation certificate, and all the TTP anonymous certificates that had been issued for that identifiable platform attestation certificate. This information may be provided to a revocation authority that could revoke all of the TTP anonymous certificates issued for that identifiable platform attestation certificate.

In one embodiment, linking a TTP anonymous certificate issued back to the identifiable platform attestation certificate could be achieved by placing in the TTP anonymous certificate a field containing a randomized encryption of the identifiable platform attestation certificate and an email address of the user of the client platform. This randomized encryption would be performed using a key known only to the TTP. Randomized encryption is used so that if the same identifiable platform attestation certificate and email address were encrypted in two different TTP anonymous certificates, the encryption result will not be the same. The email address is included for notifying the user of a linking of the TTP anonymous certificate.

A user of the client platform may be allowed to evaluate the policies on the certificates obtained from the trusted third party. Because all of the policies are encoded in the TTP anonymous certificate, the user of the client platform has the information needed to evaluate the policies. The user client attestation application can inform the user of the policy for each certificate before using the certificate, so that the user can make an informed decision about whether to use a particular policy with a verifier. For example, a verifier may have a policy that it will only accept certificates where all of the certificates used with the verifier are linked. The user would be informed of this requirement and decide whether to accept the trusted third party certificate issued in conformance with the policy. In many cases, this requirement would be acceptable to the user. For instance, if the verifier was a bank, and the user needed to identify himself to the bank for other purposes, a policy to link all of the user's certificates with the bank together may be acceptable.

In one embodiment, when linking occurs, the trusted third party application 244 sends email notification to the user of the client platform 220 requesting the TTP anonymous certificate. However, a corrupt administrator on the TTP platform could stop the email from leaving the TTP platform. This situation can be mitigated using auditors. The TTP would send the notice that linking is planned to some number n of auditors, and acknowledgements would have to be received from at least k of the n auditors before the linking could be provided by the trusted third party. These auditors would then be responsible for notifying the user that the linking had occurred. The auditors could also occasionally publish reports of any linking that has occurred, perhaps only in the instances where no email acknowledgement response was received from the user. It is possible that, in some cases, the policy would require notification that a certificate was linked to be reported to the user of the client platform within a stated time period after the event.

Competing interests are present in an environment using trusted third parties. The user wants to be assured that the user is informed if a TTP provides a link between certificates that enables identifying information to be determined as a result of the linkage. The verifying party wants to be assured that if a link to other certificates is requested, then the link is available. Thus the verifier would want all of the links developed by the TTP to be available perpetually if needed. The user is may also be concerned that an adversary might claim that the trusted third party has been destroyed, while, in fact, the trusted third party is continuing to provide links and the auditing reports are being stopped.

The confidence of the user may be increased by having multiple auditing services to support a trusted third party environment. The confidence of the verifier may be increased by having multiple TTP systems that can share keys, and can thus provide the links. Suppose we have h TTP systems that share keys. Since the code for each TTP application runs in a trusted execution environment and can be inspected, it can be assured that there are only h TTP systems that have those keys. Suppose that there are n auditors, and that for any one of the TTP systems to produce a link, the TTP application must first have acknowledgement from at least k auditors. For the interest of the verifier, if at least k auditors are cooperating, and at least one backup auditor is operating, then a link can be provided. For the interest of the user, if at least one of the k auditors or the backup auditor provides the information about a link, then the user of the client platform will be informed that the link has been provided. Thus the risks of both types of parties are reduced.

In a variation of this invention, group signatures may be used instead of traditional digital signatures. With group signatures, there is a single platform public attestation key for a large group of platforms, but each platform has a unique private key. The verifier would not know which platform signed an attestation, but the issuer would be able to open any attestation signature and determine which platform signed it. In this situation, the issuer is still a trusted third party for privacy. The issuer could be executed in a trusted execution environment such as an SGX enclave, and similar auditing of any opening of a signature could be done in a similar manner to that described above. The issuer could also have audited copies of the keys needed to open signatures as described above. Specifically, the issuer would need to get a response from a specified number of auditors before it could open a signature or to make a link to an existing signature.

For one embodiment, the functionality of the trusted third party application, which responds to certificate request from a client platform seeking an anonymous certificate, is deployed as software. However, it is contemplated that such functionality may be deployed as dedicated hardware or firmware. Instructions or code forming the firmware or software are stored on a machine-readable medium.

The following examples pertain to further embodiments.

In Example 1, an apparatus to enable a client platform to provide an attestation to a verifier, without exposing privacy-sensitive information of either the client platform or a user of the client platform, includes a processor and a memory, where the memory comprises instructions that, when executed, cause the processor to establish a portion of the memory as a trusted execution environment, and execute a trusted third party application within the trusted execution environment. The trusted third party application includes receiving logic to receive a signed public key and an identifier for a verifier from a user client attestation application executing on a client platform, the signed public key being signed with an identifiable platform attestation private key for the client platform, verifying logic to verify the signed public key, policy-determining logic to determine a policy of the verifier, policy-encoding logic to encode the policy into a trusted third party anonymous certificate for the signed public key, issuing logic to issue the trusted third party anonymous certificate without including identification information of the client platform, and sending logic to send the trusted third party anonymous certificate to the user client attestation application.

In Example 2, the policy-determining logic is to dynamically determine that the policy requires linking the trusted third party anonymous certificate to a second trusted third party anonymous certificate. The trusted third party application further comprises linking logic to link the trusted third party anonymous certificate to the second trusted third party anonymous certificate.

In Example 3, the policy-determining logic is to dynamically determine that the policy allows linking the trusted third party anonymous certificate to the second trusted third party anonymous certificate only if each of the trusted third party anonymous certificate and the second trusted third party anonymous certificate is linked to the verifier. The trusted third party application further comprises linking logic to link the trusted third party anonymous certificate to the second trusted third party anonymous certificate only if each of the trusted third party anonymous certificate and the second trusted third party anonymous certificate is linked to the verifier.

In Example 4, the policy-determining logic is to dynamically determine that the policy disallows linking the trusted third party anonymous certificate to the second trusted third party anonymous certificate if the second trusted third party anonymous certificate is not linked to the verifier. The trusted third party application further comprises linking logic that is not to link the trusted third party anonymous certificate to the second trusted third party anonymous certificate if the second trusted third party anonymous certificate is not linked to the verifier.

In Example 5, the policy-determining logic is to dynamically determine that the policy disallows linking the trusted third party anonymous certificate to the second trusted third party anonymous certificate if the second trusted third party anonymous certificate is linked to a different verifier. The trusted third party application further comprises linking logic that is not to link the trusted third party anonymous certificate to the second trusted third party anonymous certificate if the second trusted third party anonymous certificate is linked to the different verifier.

In Example 6, the signed public key being signed with an identifiable platform attestation private key for the client platform provides an identifiable platform attestation certificate for the client platform. The policy-determining logic is to dynamically determine that the policy requires linking the trusted third party anonymous certificate to the identifiable platform attestation certificate for the client platform. The trusted third party application further comprises linking logic to link the trusted third party anonymous certificate to the identifiable platform attestation certificate for the client platform.

In Example 7, the policy-determining logic is to dynamically determine that the policy requires linking the trusted third party anonymous certificate to each of a plurality of previously-issued trusted third party anonymous certificates issued to the client platform for the verifier. The trusted third party application further comprises linking logic to link the trusted third party anonymous certificate to each of the plurality of previously-issued trusted third party anonymous certificates issued to the client platform for the verifier.

In Example 8, the trusted third party application further comprises notifying logic to notify a plurality of n auditors that the policy requires the trusted third party anonymous certificate to be linked to the second trusted third party anonymous certificate prior to performing the linking. If the notifying logic receives a respective acknowledgement from each of at least k auditors of the plurality of n auditors, the trusted third party application is to link the trusted third party anonymous certificate to the second trusted third party anonymous certificate.

In Example 9, the trusted third party application further comprises user-notifying logic to send a notification to a user of the client platform when the trusted third party application links the trusted third party anonymous certificate to the second trusted third party anonymous certificate.

In Example 10, a method to enable a client platform to provide an attestation to a verifier, without exposing privacy-sensitive information of either the client platform or a user of the client platform, includes establishing a portion of a memory of the computing device as a trusted execution environment; causing a trusted third party application to execute within the trusted execution environment; receiving, by the trusted third party application, a signed public key and an identifier for a verifier from a user client attestation application executing on a client platform, the signed public key being signed with an identifiable platform attestation private key for the client platform; verifying, by the trusted third party application, the signed public key; determining, by the trusted third party application, a policy of the verifier; encoding, by the trusted third party application, the policy into a trusted third party anonymous certificate for the signed public key; issuing, by the trusted third party application, the trusted third party anonymous certificate without including identification information of the client platform; and sending, by the trusted third party application, the trusted third party anonymous certificate to the user client attestation application.

In Example 11, the method further includes dynamically determining, by the trusted third party application, that the policy requires linking the trusted third party anonymous certificate to a second trusted third party anonymous certificate; and linking, by the trusted third party application, the trusted third party anonymous certificate to the second trusted third party anonymous certificate.

In Example 12, the method of Example 10 further includes dynamically determining, by the trusted third party application, that the policy allows linking the trusted third party anonymous certificate to a second trusted third party anonymous certificate only if each of the trusted third party anonymous certificate and the second trusted third party certificate is linked to the verifier; and linking, by the trusted third party application, the trusted third party anonymous certificate to the second trusted third party anonymous certificate only if each of the trusted third party anonymous certificate and the second trusted third party certificate is linked to the verifier.

In Example 13, the method of Example 10 further includes dynamically determining, by the trusted third party application, that the policy disallows linking the trusted third party anonymous certificate to a second trusted third party anonymous certificate if the second trusted third party certificate is not linked to the verifier, and declining to link, by the trusted third party application, the trusted third party anonymous certificate to the second trusted third party anonymous certificate if the second trusted third party certificate is not linked to the verifier.

In Example 14, the method of Example 10 further includes dynamically determining, by the trusted third party application, that the policy disallows linking the trusted third party anonymous certificate to a second trusted third party anonymous certificate if the second trusted third party certificate is linked to a different verifier; and declining to link, by the trusted third party application, the trusted third party anonymous certificate to the second trusted third party anonymous certificate if the second trusted third party certificate is linked to the different verifier.

In Example 15, the method of Example 10 further includes receiving, by the trusted third party application, an identifiable platform attestation certificate for the client platform from the user client attestation application; dynamically determining, by the trusted third party application, that the policy requires linking the trusted third party anonymous certificate to the identifiable platform attestation certificate for the client platform; and linking, by the trusted third party application, the trusted third party anonymous certificate to the identifiable platform attestation certificate for the client platform.

In Example 16, the method of Example 10 further includes dynamically determining, by the trusted third party application, that the policy requires linking the trusted third party anonymous certificate to each of a plurality of previously-issued third party anonymous certificates issued to the client platform for the verifier; and linking, by the trusted third party application, the trusted third party anonymous certificate to the each of the plurality of previously-issued third party anonymous certificates issued to the client platform for the verifier.

In Example 17, the method of Example 10 further includes notifying, by the trusted third party application, a plurality of n auditors that the policy requires the trusted third party anonymous certificate to be linked to the second trusted third party anonymous certificate prior to performing the linking; and linking, by the trusted third party application, the trusted third party anonymous certificate to the second trusted third party anonymous certificate if the trusted third party application receives a respective acknowledgement from at least k auditors of the plurality of n auditors.

In Example 18, the method of Example 11 further includes sending, by the trusted third party application, a notification to a user of the client platform when the trusted third party application links the trusted third party anonymous certificate to the second trusted third party anonymous certificate.

In Example 19, at least one computer-readable medium includes instructions that, when executed, cause a computing device to perform the methods of any one of Examples 10-18.

In Example 20, an apparatus comprises means to perform a method of any one of the above Examples.

In Example 21, an apparatus to enable a client platform to provide an attestation to a verifier, without exposing privacy-sensitive information of either the client platform or a user of the client platform, includes means for establishing a portion of a memory of the computing device as a trusted execution environment; means for causing a trusted third party application to execute within the trusted execution environment; means for receiving a signed public key and an identifier for a verifier from a user client attestation application executing on a client platform, the signed public key being signed with an identifiable platform attestation private key for the client platform; means for verifying the signed public key; means for determining a policy of the verifier; means for encoding the policy into a trusted third party anonymous certificate for the signed public key; means for issuing the trusted third party anonymous certificate without including identification information of the client platform; and means for sending the trusted third party anonymous certificate to the user client attestation application.

In Example 22, the apparatus of Example 21 further includes means for dynamically determining that the policy requires linking the trusted third party anonymous certificate to a second trusted third party anonymous certificate; and means for linking the trusted third party anonymous certificate to the second trusted third party anonymous certificate.

In Example 23, the apparatus of Example 21 further includes means for dynamically determining that the policy allows linking the trusted third party anonymous certificate to a second trusted third party anonymous certificate only if each of the trusted third party anonymous certificate and the second trusted third party certificate is linked to the verifier; and means for linking the trusted third party anonymous certificate to the second trusted third party anonymous certificate only if each of the trusted third party anonymous certificate and the second trusted third party certificate is linked to the verifier.

In Example 24, the apparatus of Example 21 further includes means for dynamically determining that the policy disallows linking the trusted third party anonymous certificate to a second trusted third party anonymous certificate if the second trusted third party certificate is not linked to the verifier; and means for linking the trusted third party anonymous certificate to the second trusted third party anonymous certificate, where the means for linking the trusted third party anonymous certificate to the second trusted third party anonymous certificate does not link the trusted third party anonymous certificate to the second trusted third party anonymous certificate if the second trusted third party certificate is not linked to the verifier.

In Example 25, the apparatus of Example 21 further includes means for dynamically determining that the policy disallows linking the trusted third party anonymous certificate to a second trusted third party anonymous certificate if the second trusted third party certificate is linked to a different verifier; and means for linking the trusted third party anonymous certificate to the second trusted third party anonymous certificate, where the means for linking the trusted third party anonymous certificate to the second trusted third party anonymous certificate does not link the trusted third party anonymous certificate to the second trusted third party anonymous certificate if the second trusted third party certificate is linked to the different verifier.

In Example 26, the apparatus of Example 21 further includes means for receiving an identifiable platform attestation certificate for the client platform from the user client attestation application; means for dynamically determining that the policy requires linking the trusted third party anonymous certificate to the identifiable platform attestation certificate for the client platform; and means for linking the trusted third party anonymous certificate to the identifiable platform attestation certificate for the client platform.

In Example 27, the apparatus of Example 21 further includes means for dynamically determining that the policy requires linking the trusted third party anonymous certificate to each of a plurality of previously-issued third party anonymous certificates issued to the client platform for the verifier; and means for linking the trusted third party anonymous certificate to each of the plurality of previously-issued third party anonymous certificates issued to the client platform for the verifier.

In Example 28, the apparatus of Example 21 further includes means for notifying a plurality of n auditors that the policy requires the trusted third party anonymous certificate to be linked to the second trusted third party anonymous certificate prior to performing the linking; and means for linking the trusted third party anonymous certificate to the second trusted third party anonymous certificate if the trusted third party application receives a respective acknowledgement from at least k auditors of the plurality of n auditors.

In Example 29, the apparatus of Example 21 further includes means for sending a notification to a user of the client platform when the trusted third party application links the trusted third party anonymous certificate to the second trusted third party anonymous certificate.

In Example 30, a method to enable a client platform to provide an attestation to a verifier, without exposing privacy-sensitive information of either the client platform or a user of the client platform, includes establishing a portion of a memory of the computing device as a trusted execution environment, where the computing device is a client platform; causing a user client attestation application to execute within the trusted execution environment; signing, by the user client attestation application, a public key for the client platform with an identifiable platform attestation private key for the client platform; providing, by the user client attestation application, the signed public key and an identifier for a verifier to a trusted third party application executing on a server platform; and receiving, by the user client attestation application, a trusted third party anonymous certificate from the trusted third party application, where the trusted third party anonymous certificate comprises an encoded policy for the verifier.

In Example 31, the method of Example 30 further includes providing, by the user client attestation application, the trusted third party anonymous certificate to the verifier.

In Example 32, the method of Example 30 further includes providing, by the user client attestation application, the encoded policy to a user of the client platform; receiving, by the user client attestation application, an indication from the user of the client platform whether to provide the trusted third party anonymous certificate to the verifier; and providing, by the user client attestation application, the trusted third party anonymous certificate to the verifier if the indication is to provide the trusted third party anonymous certificate to the verifier.

In Example 33, the method of Example 30 further includes creating, by the user client attestation application, a new anonymous attestation private key and a new anonymous attestation public key for the client platform, where the new anonymous attestation public key is the public key for the client platform, and where providing the signed public key and the identifier for the verifier to the trusted third party application comprises sending a certificate request including the signed public key and the identifier for the verifier to the trusted third party application.

In Example 34, at least one computer-readable medium includes instructions that, when executed, cause a computing device to perform the methods of Examples 30-33.

In Example 35, an apparatus comprises means to perform a method of any of the above Examples.

In Example 36, an apparatus to enable a client platform to provide an attestation to a verifier, without exposing privacy-sensitive information of either the client platform or a user of the client platform, includes means for establishing a portion of a memory of the computing device as a trusted execution environment, where the computing device is a client platform; means for causing a user client attestation application to execute within the trusted execution environment; means for signing a public key for the client platform with an identifiable platform attestation private key for the client platform; and means for providing the signed public key and an identifier for a verifier to a trusted third party application executing on a server platform; and means for receiving, by the user client attestation application, a trusted third party anonymous certificate from the trusted third party application, where the trusted third party anonymous certificate comprises an encoded policy for the verifier.

In Example 37, the apparatus of Example 36 further includes means for providing the trusted third party anonymous certificate to the verifier.

In Example 38, the apparatus of Example 36 further includes means for providing the encoded policy to a user of the client platform; means for receiving an indication from the user of the client platform whether to provide the trusted third party anonymous certificate to the verifier; and means for providing the trusted third party anonymous certificate to the verifier if the indication is to provide the trusted third party anonymous certificate to the verifier.

In Example 39, the apparatus of Example 36 further includes means for creating a new anonymous attestation private key and a new anonymous attestation public key for the client platform, where the new anonymous attestation public key is the public key for the client platform, and where providing the signed public key and the identifier for the verifier to the trusted third party application comprises sending a certificate request including the signed public key and the identifier for the verifier to the trusted third party application.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a computing device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a processor; and
a memory, wherein the memory comprises instructions that, when executed, cause the processor to:
establish a portion of the memory as a trusted execution environment, and
execute a trusted third party application within the trusted execution environment, the trusted third party application to include:
receiving logic to receive a signed public key and an identifier for a verifier from a user client attestation application executing on a client platform, the signed public key being signed with an identifiable platform attestation private key for the client platform,
verifying logic to verify the signed public key,
policy-determining logic to determine a policy of the verifier,
policy-encoding logic to encode the policy into a trusted third party anonymous certificate for the signed public key,
issuing logic to issue the trusted third party anonymous certificate without including identification information of the client platform, and
sending logic to send the trusted third party anonymous certificate to the user client attestation application.

2. The apparatus of claim 1, wherein
the policy-determining logic is to dynamically determine that the policy requires linking the trusted third party anonymous certificate to a second trusted third party anonymous certificate, and
the trusted third party application further comprises linking logic to link the trusted third party anonymous certificate to the second trusted third party anonymous certificate.

3. The apparatus of claim 2, wherein
the policy-determining logic is to dynamically determine that the policy allows linking the trusted third party anonymous certificate to the second trusted third party anonymous certificate only if each of the trusted third party anonymous certificate and the second trusted third party anonymous certificate is linked to the verifier, and
the trusted third party application further comprises linking logic to link the trusted third party anonymous certificate to the second trusted third party anonymous certificate only if each of the trusted third party anonymous certificate and the second trusted third party anonymous certificate is linked to the verifier.

4. The apparatus of claim 2, wherein
the policy-determining logic is to dynamically determine that the policy disallows linking the trusted third party anonymous certificate to the second trusted third party anonymous certificate if the second trusted third party anonymous certificate is not linked to the verifier, and
the trusted third party application further comprises linking logic that is not to link the trusted third party anonymous certificate to the second trusted third party anonymous certificate if the second trusted third party anonymous certificate is not linked to the verifier.

5. The apparatus of claim 2, wherein
the policy-determining logic is to dynamically determine that the policy disallows linking the trusted third party anonymous certificate to the second trusted third party anonymous certificate if the second trusted third party anonymous certificate is linked to a different verifier, and
the trusted third party application further comprises linking logic that is not to link the trusted third party anonymous certificate to the second trusted third party anonymous certificate if the second trusted third party anonymous certificate is linked to the different verifier.

6. The apparatus of claim 2, wherein
the signed public key being signed with an identifiable platform attestation private key for the client platform provides an identifiable platform attestation certificate for the client platform,
the policy-determining logic is to dynamically determine that the policy requires linking the trusted third party anonymous certificate to the identifiable platform attestation certificate for the client platform, and
the trusted third party application further comprises linking logic to link the trusted third party anonymous certificate to the identifiable platform attestation certificate for the client platform.

7. The apparatus of claim 2, wherein
the policy-determining logic is to dynamically determine that the policy requires linking the trusted third party anonymous certificate to each of a plurality of previously-issued trusted third party anonymous certificates issued to the client platform for the verifier, and the trusted third party application further comprises linking logic to link the trusted third party anonymous certificate to each of the plurality of previously-issued trusted third party anonymous certificates issued to the client platform for the verifier.

8. The apparatus of claim 2, wherein the trusted third party application further comprises notifying logic to notify a plurality of n auditors that the policy requires the trusted third party anonymous certificate to be linked to the second trusted third party anonymous certificate prior to performing the linking, if the notifying logic receives a respective acknowledgement from each of at least k auditors of the plurality of n auditors, the trusted third party application is to link the trusted third party anonymous certificate to the second trusted third party anonymous certificate.

9. The apparatus of claim 2, wherein the trusted third party application further comprises user-notifying logic to send a notification to a user of the client platform when the trusted third party application links the trusted third party anonymous certificate to the second trusted third party anonymous certificate.

10. At least one non-transitory computer-readable medium comprising instructions that, when executed by a processor, cause a computing device to:

establish a portion of a memory of the computing device as a trusted execution environment, and cause a trusted third party application to execute within the trusted execution environment, the trusted third party application to (i) receive a signed public key and an identifier for a verifier from a user client attestation application executing on a client platform, the signed public key being signed with an identifiable platform attestation private key for the client platform, (ii) verify the signed public key, (iii) determine a policy of the verifier, (iv) encode the policy into a trusted third party anonymous certificate for the signed public key, (v) issue the trusted third party anonymous certificate without including identification information of the client platform, and (vi) send the trusted third party anonymous certificate to the user client attestation application.

11. The at least one non-transitory computer-readable medium of claim 10, wherein the trusted third party application is to dynamically determine that the policy requires linking the trusted third party anonymous certificate to a second trusted third party anonymous certificate, and the trusted third party application is to link the trusted third party anonymous certificate to the second trusted third party anonymous certificate.

12. The at least one non-transitory computer-readable medium of claim 11, wherein the trusted third party application is to dynamically determine that the policy allows linking the trusted third party anonymous certificate to the second trusted third party anonymous certificate only if each of the trusted third party anonymous certificate and the second trusted third party anonymous certificate is linked to the verifier, and the trusted third party application is to link the trusted third party anonymous certificate to the second trusted third party anonymous certificate only if each of the trusted third party anonymous certificate and the second trusted third party anonymous certificate is linked to the verifier.

13. The at least one non-transitory computer-readable medium of claim 11, wherein the trusted third party application is to dynamically determine that the policy disallows linking the trusted third party anonymous certificate to the second trusted third party anonymous certificate if the second trusted third party anonymous certificate is not linked to the verifier, and the trusted third party application is not to link the trusted third party anonymous certificate to the second trusted third party anonymous certificate if the second trusted third party anonymous certificate is not linked to the verifier.

14. The at least one non-transitory computer-readable medium of claim 11, wherein the trusted third party application is to dynamically determine that the policy disallows linking the trusted third party anonymous certificate to the second trusted third party anonymous certificate if the second trusted third party anonymous certificate is linked to a different verifier, and the trusted third party application is not to link the trusted third party anonymous certificate to the second trusted third party anonymous certificate if the second trusted third party anonymous certificate is linked to the different verifier.

15. The at least one non-transitory computer-readable medium of claim 11, wherein the signed public key being signed with an identifiable platform attestation private key for the client platform provides an identifiable platform attestation certificate for the client platform, the trusted third party application is to dynamically determine that the policy requires linking the trusted third party anonymous certificate to the identifiable platform attestation certificate for the client platform, and the trusted third party application is to link the trusted third party anonymous certificate to the identifiable platform attestation certificate for the client platform.

16. The at least one non-transitory computer-readable medium of claim 11, wherein the trusted third party application is to dynamically determine that the policy requires linking the trusted third party anonymous certificate to each of a plurality of previously-issued trusted third party anonymous certificates issued to the client platform for the verifier, and the trusted third party application is to link the trusted third party anonymous certificate to each of the plurality of previously-issued trusted third party anonymous certificates issued to the client platform for the verifier.

17. The at least one non-transitory computer-readable medium of claim 11, wherein the trusted third party application is to notify a plurality of n auditors that the policy requires the trusted third party anonymous certificate to be linked to the second trusted third party anonymous certificate prior to performing the linking, if the trusted third party application receives a respective acknowledgement from at least k auditors of the plurality of n auditors, the trusted third party application is to link the trusted third party anonymous certificate to the second trusted third party anonymous certificate.

18. The at least one non-transitory computer-readable medium of claim 11, wherein
the trusted third party application is to send a notification to a user of the client platform when the trusted third party application links the trusted third party anonymous certificate to the second trusted third party anonymous certificate.

19. A method comprising:
establishing a portion of a memory of a computing device as a trusted execution environment;
causing a trusted third party application to execute within the trusted execution environment;
receiving, by the trusted third party application, a signed public key and an identifier for a verifier from a user client attestation application executing on a client platform, the signed public key being signed with an identifiable platform attestation private key for the client platform;
verifying, by the trusted third party application, the signed public key;
determining, by the trusted third party application, a policy of the verifier;
encoding, by the trusted third party application, the policy into a trusted third party anonymous certificate for the signed public key;
issuing, by the trusted third party application, the trusted third party anonymous certificate without including identification information of the client platform; and
sending, by the trusted third party application, the trusted third party anonymous certificate to the user client attestation application.

20. The method of claim 19, further comprising:
dynamically determining, by the trusted third party application, that the policy requires linking the trusted third party anonymous certificate to a second trusted third party anonymous certificate; and
linking, by the trusted third party application, the trusted third party anonymous certificate to the second trusted third party anonymous certificate.

21. The method of claim 19, further comprising:
receiving, by the trusted third party application, an identifiable platform attestation certificate for the client platform from the user client attestation application;
dynamically determining, by the trusted third party application, that the policy requires linking the trusted third party anonymous certificate to the identifiable platform attestation certificate for the client platform; and
linking, by the trusted third party application, the trusted third party anonymous certificate to the identifiable platform attestation certificate for the client platform.

22. At least one non-transitory computer-readable medium comprising instructions that, when executed by a processor, cause a computing device to:
establish a portion of a memory of the computing device as a trusted execution environment, wherein the computing device is a client platform, and
cause a user client attestation application to execute within the trusted execution environment, the user client attestation application to: sign an anonymous attestation public key for the client platform with an identifiable platform attestation private key for the client platform; send a certificate request signed by the identifiable platform attestation private key, the certificate request comprising the signed anonymous attestation public key and an identifier for a verifier, to a trusted third party application executing on a server platform, and receive a trusted third party anonymous certificate from the trusted third party application, wherein the trusted third party anonymous certificate does not include identification information of the client platform and comprises an encoded policy for the verifier.

23. The at least one non-transitory computer-readable medium of claim 22, wherein the user client attestation application is further to: provide the trusted third party anonymous certificate to the verifier.

24. The at least one non-transitory computer-readable medium of claim 22, wherein the user client attestation application is further to: provide the encoded policy to a user of the client platform, receive an indication from the user of the client platform whether to provide the trusted third party anonymous certificate to the verifier, and provide the trusted third party anonymous certificate to the verifier if the indication is to provide the trusted third party anonymous certificate to the verifier.

25. The at least one non-transitory computer-readable medium of claim 22, wherein the user client attestation application is further to:
create a new anonymous attestation private key and a new anonymous attestation public key for the client platform, wherein the new anonymous attestation public key is the anonymous attestation public key for the client platform, and wherein to provide the signed public key and the identifier for the verifier to the trusted third party application comprises to send a certificate request including the signed public key and the identifier for the verifier to the trusted third party application.

* * * * *